(12) United States Patent
Miyazaki et al.

(10) Patent No.: US 10,848,391 B2
(45) Date of Patent: Nov. 24, 2020

(54) INFORMATION PROCESSING APPARATUS, INFORMATION PROCESSING METHOD, TERMINAL, CONTROL METHOD AND PROGRAM FOR URGING AN ACTION EXECUTED BY A DIFFERENT USER BASED ON A RELATIONSHIP POINT

(71) Applicant: SONY CORPORATION, Tokyo (JP)

(72) Inventors: Reiko Miyazaki, Tokyo (JP); Ken Onogi, Tokyo (JP); Yasushi Okumura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 711 days.

(21) Appl. No.: 14/433,702

(22) PCT Filed: Oct. 10, 2013

(86) PCT No.: PCT/JP2013/077609
§ 371 (c)(1),
(2) Date: Apr. 6, 2015

(87) PCT Pub. No.: WO2014/097716
PCT Pub. Date: Jun. 26, 2014

(65) Prior Publication Data
US 2015/0249577 A1 Sep. 3, 2015

(30) Foreign Application Priority Data
Dec. 21, 2012 (JP) ................................. 2012-279277

(51) Int. Cl.
*G06F 3/048* (2013.01)
*H04L 12/24* (2006.01)
(Continued)

(52) U.S. Cl.
CPC ......... *H04L 41/22* (2013.01); *G06Q 30/0271* (2013.01); *G06Q 50/01* (2013.01); *H04L 67/22* (2013.01)

(58) Field of Classification Search
CPC ......... G06F 3/048; H04L 41/22; H04L 67/22; G06Q 50/01; G06Q 30/0271; G06Q 99/00
See application file for complete search history.

(56) References Cited

U.S. PATENT DOCUMENTS 8,595,167 B1 * 11/2013 Grieve .................. G06Q 50/01
706/45
2009/0133081 A1 * 5/2009 Sakai ..................... H04N 7/173
725/105
(Continued)

FOREIGN PATENT DOCUMENTS

| JP | 2005-033600 | 2/2005 |
|---|---|---|
| JP | 2009-157907 | 7/2009 |

(Continued)

OTHER PUBLICATIONS

Apr. 12, 2016, European Search Report for related EP Application No. 13864794.6.

*Primary Examiner* — Jeanette J Parker
(74) *Attorney, Agent, or Firm* — Paratus Law Group, PLLC

(57) ABSTRACT

Provided is an information processing apparatus including a determination unit configured to determine whether to urge a user who uses a terminal to execute an action corresponding to an action executed by a different user who uses a different terminal, based on a relationship between the user and the different user, and acquire a determination result, (Continued)

and an output control unit configured to perform control in a manner that display corresponding to the determination result is performed.

20 Claims, 12 Drawing Sheets

(51) Int. Cl.
  *G06Q 30/02* (2012.01)
  *G06Q 50/00* (2012.01)
  *H04L 29/08* (2006.01)

(56) References Cited

U.S. PATENT DOCUMENTS

| | | | | |
|---|---|---|---|---|
| 2013/0103773 | A1* | 4/2013 | Tsukidate | H04L 51/12 |
| | | | | 709/206 |
| 2014/0129955 | A1* | 5/2014 | Yamahara | G06F 3/0481 |
| | | | | 715/745 |
| 2014/0181195 | A1* | 6/2014 | Sullivan | H04L 67/22 |
| | | | | 709/204 |
| 2014/0337883 | A1* | 11/2014 | Foote | H04N 21/44222 |
| | | | | 725/34 |

FOREIGN PATENT DOCUMENTS

| | | |
|---|---|---|
| JP | 2011-166622 | 8/2011 |
| JP | 2012-164091 | 8/2012 |
| WO | WO2011-114634 A1 | 3/2011 |

* cited by examiner

INFORMATION PROCESSING APPARATUS, INFORMATION PROCESSING METHOD, TERMINAL, CONTROL METHOD AND PROGRAM FOR URGING AN ACTION EXECUTED BY A DIFFERENT USER BASED ON A RELATIONSHIP POINT

CROSS REFERENCE TO PRIOR APPLICATION

This application is a National Stage Patent Application of PCT International Patent Application No. PCT/JP2013/077609 (filed on Oct. 10, 2013) under 35 U.S.C. § 371, which claims priority to Japanese Patent Application No. 2012-279277 (filed on Dec. 21, 2012), which are all hereby incorporated by reference in their entirety.

TECHNICAL FIELD

The present disclosure relates to an information processing apparatus, an information processing method, a terminal, a control method and a program.

BACKGROUND ART

Recently, there is a technique for deciding an action to be executed, on the basis of an action execution state by a different user when the user executes an action. For example, there is disclosed a technique for a user to decide whether to make a recording reservation of content, on the basis of the recording reservation state of the content by a different user (for example, see Patent Literature 1). According to such a technique, it is possible to recommend content with higher utility value for the user and promote the use of the content by the user.

Moreover, there is a technique for controlling the presentation of information on content for the user on the basis of the tendency of evaluation with respect to the content by the user, and so on (for example, see Patent Literature 2). According to such a technique, it is possible to use the users evaluation given to the content more effectively, recommend content with higher utility value for the user and promote the use of the content by the user.

CITATION LIST

Patent Literature

Patent Literature 1: JP 2011-166622A
Patent Literature 2: JP 2009-157907A

SUMMARY OF INVENTION

Technical Problem

However, even for an action executed by a different user, a case where the action significance varies depending on the relationship between the different user and the user is assumed. Therefore, when the action executed by the different user is presented to the user, it is desirable that a technology that can control presentation taking into account the relationship between the different user and the user be realized.

Solution to Problem

According to the present disclosure, there is provided an information processing apparatus including a determination unit configured to determine whether to urge a user who uses a terminal to execute an action corresponding to an action executed by a different user who uses a different terminal, based on a relationship between the user and the different user, and acquire a determination result, and an output control unit configured to perform control in a manner that display corresponding to the determination result is performed.

According to the present disclosure, there is provided an information processing method including determining whether to urge a user who uses a terminal to execute an action corresponding to an action executed by a different user who uses a different terminal, based on a relationship between the user and the different user, and acquiring a determination result, and performing control in a manner that display corresponding to the determination result is performed.

According to the present disclosure, there is provided a terminal including an acquisition unit configured to acquire a determination result indicating whether to urge a user who uses the terminal to execute an action corresponding to an action executed by a different user who uses a different terminal, based on a relationship between the user and the different user, and a display control unit configured to perform control in a manner that display corresponding to the determination result is performed.

According to the present disclosure, there is provided a control method including acquiring a determination result indicating whether to urge a user who uses a terminal to execute an action corresponding to an action executed by a different user who uses a different terminal, based on a relationship between the user and the different user, and performing control in a manner that display corresponding to the determination result is performed.

According to the present disclosure, there is provided a program that causes a computer to function as a terminal including an acquisition unit configured to acquire a determination result indicating whether to urge a user who uses the terminal to execute an action corresponding to an action executed by a different user who uses a different terminal, based on a relationship between the user and the different user, and a display control unit configured to perform control in a manner that display corresponding to the determination result is performed.

Advantageous Effects of Invention

As described above, according to the present disclosure, it is possible to control presentation taking into account the relationship between a different user and a user when an action executed by the different user is presented to the user.

DESCRIPTION OF EMBODIMENTS

Figure 1:
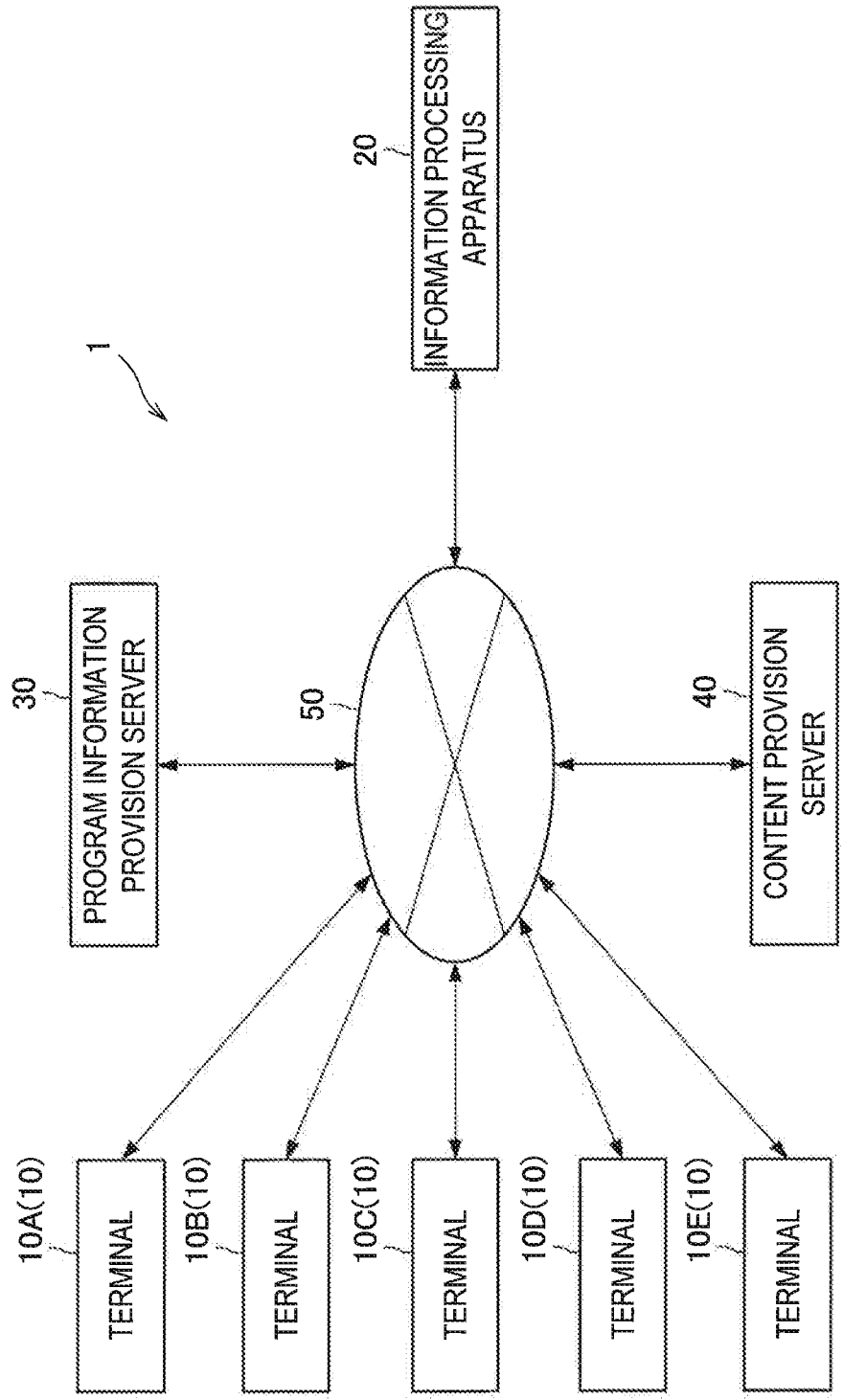
FIG. 1 is a diagram illustrating a configuration example of an information processing system according to an embodiment of the present disclosure.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

In the present specification and drawings, a plurality of constituent elements having substantially the same functional configuration may be distinguished by afferent alphabets attached after the same reference numerals. However, when each of a plurality of elements having substantially the same functional configuration need not be especially distinguished, only the same reference sign is assigned thereto.

Moreover, the "Description of Embodiments" is described according to the following item order.
1. Embodiment
1-1. Configuration example of information processing system
1-2. Functional configuration example of terminal
1-3. Functional configuration example of information processing apparatus
1-4. Details of function of information processing system
1-5. Operation of information processing apparatus
2. Modification example
2-1. Details of function of information processing system
2-2. Operation of information processing apparatus
3. Effect
4. Conclusion

1. Embodiment

First, an embodiment of the present disclosure is described.
[1-1. Configuration Example of Information Processing System]

First, a configuration example of an information processing system 1 according to an embodiment of the present disclosure is described. FIG. 1 is a diagram illustrating a configuration example of die information processing system 1 according to an embodiment of the present disclosure. As illustrated in FIG. 1, the information processing system 1 includes terminals 10A to 10E as an example of multiple terminals 10. Moreover, as illustrated in FIG. 1, the information processing system 1 includes an information processing apparatus 20, a program information provision server 30 and a content provision server 40.

The terminal 10 can perform communication with different terminals 10, the information processing apparatus 20, the program information provision server 30 and the content provision server 40 through a network 50. In this specification, a case where the information processing system 1 includes five terminals 10 (terminals 10A to 10E) as an example of the multiple terminals 10 is mainly described, but the number of terminals 10 included in the information processing system 1 is not especially limited as long as it is plural.

Moreover, in the following explanation, the user who uses the terminal 10A is assumed as user A, and, similarly, the users who use terminals 10B to 10E are assumed as users B to E respectively. Moreover, in the following explanation, users B to E are assumed as "different users", user A as "user" is paid attention to, and how user A executes an action on the basis of an action executed by users B to E is mainly described.

The information processing apparatus 20 can perform communication with the terminal 10, the program information provision server 30 and the content provision server 40 through the network 50. Here, the information processing apparatus 20 is formed separately from the terminal 10 in the example illustrated in FIG. 1, but any of multiple terminals 10 may have the function of the information processing apparatus 20. In this case, the terminal 10 having the function of the information processing apparatus 20 may be specified in any method. For example, the terminal 10 having the function of the information processing apparatus 20 may be defined beforehand, may be the terminal 10 started first, or may be dynamically changed.

The program information provision server 30 can perform communication with the terminal 10, the information processing apparatus 20 and the content provision server 40 through the network 50. For example, the program information provision server 30 has a function to provide program information to the terminal 10 and the content provision server 40. For example, the program information may be EPG (Electronic Program Guide) data though the program information is described later in detail. In this case, the program information provision server 30 functions as an EPG server.

The content provision server 40 can perform communication with the terminal 10, the information processing apparatus 20 and the program information provision server 30 through the network 50. For example, the content provision server 40 has a function to provide program content to the terminal 10. A case where content provided by the content provision server 40 is program content is described in the present embodiment, but the kind of content is not especially limited, and the content may be content other than program content (for example, image content, sound content and text data, and so on). Moreover, in the following explanation, the program content may be simply referred to as a "program".

Here, there is a technique for recommending content with higher utility value for the user and promoting the use of the content by the user, but, even for an action executed by a different user, a case where the action significance varies depending on the relationship between the different user and the user is assumed. Therefore, in the present specification, there is suggested a technique that can control presentation taking into account the relationship between a different user and a user when the action executed by the different user is presented to the user.

A configuration example of the information processing system 1 according to an embodiment of the present disclosure has been described above.

[1-2. Functional Configuration Example of Terminal]

Figure 2:
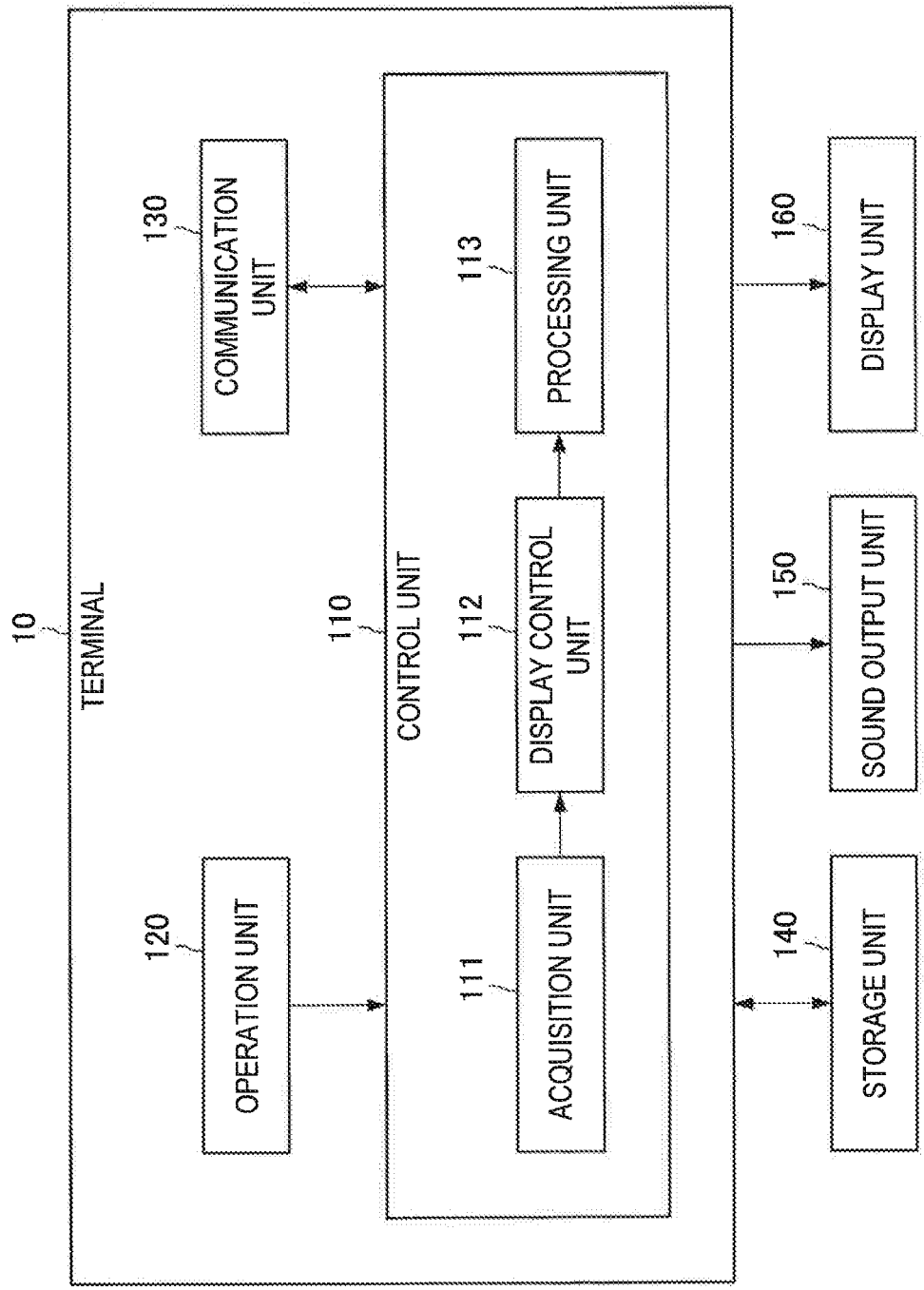
FIG. 2 is a diagram illustrating a functional configuration example of a terminal according to an embodiment of the present disclosure.

Subsequently, a functional configuration example of the terminal 10 according to an embodiment of the present disclosure is described. FIG. 2 is a diagram illustrating a functional configuration example of the terminal 10 according to the embodiment of the present disclosure. As illustrated in FIG. 2, the terminal 10 includes a control unit 110, an operation unit 120, a communication unit 130, a storage unit 140, a sound output unit 150 and a display unit 160.

For example, the control unit 110 corresponds to a processor such as a CPU (Central Processing Unit). The control unit 110 fulfills various functions included in the control unit 110 by executing a program stored in the storage unit 140 or other storage media. The control unit 110 includes an acquisition unit 111, a display control unit 112 and a processing unit 113.

The acquisition unit 111 acquires a determination result by a determination unit 211 included in the information processing apparatus 20. For example, the determination result acquired by the acquisition unit 111 is provided to the acquisition unit 111 by an output control unit 213 included in the information processing apparatus 20. Details of the determination by the determination unit 211 are described later.

The display control unit 112 performs control such that display corresponding to the determination result acquired by the acquisition unit 111 is performed. For example, the display control unit 112 controls the display unit 160 such that the display corresponding to the determination result is performed by the display unit 160. Details of the display controlled by the display control unit 112 are described later.

In a case where a user operation to select an action is executed by the user who browses the display controlled by the display control unit 112, the processing unit 113 performs processing corresponding to the action selected by the user operation. Details of the processing performed by the processing unit 113 are described later.

The operation unit 120 detects the user operation and outputs it to the control unit 110. In this specification, since a case where the operation unit 120 includes a touch panel is assumed, the user operation is input using a user's finger as an operation body. However, the operation unit 120 may include hardware other than the touch panel. Here, the operation unit 120 is integrated with the terminal 10 in the example illustrated in FIG. 2, but the operation unit 120 may be formed separately from the terminal 10.

The communication unit 130 can perform communication with different terminals 10, the information processing apparatus 20, the program information provision server 30 and the content provision server 40 through the network 50. For example, the communication unit 130 can receive program information from the program information provision server 30. Moreover, for example, the communication unit 130 can transmit recording reservation information generated on the basis of the program information to the content provision server 40. Moreover, for example, the communication unit 130 can receive program content corresponding to the recording reservation information from the content provision server 40. Here, the communication unit 130 is integrated with the terminal 10 in the example illustrated in FIG. 2, but the communication unit 130 may be formed separately from the terminal 10.

The storage unit 140 stores a program to operate the control unit 110, by the use of a storage medium such as a semiconductor memory and a hard disk. Moreover, for example, the storage unit 140 can store various kinds of data (for example, various kinds of setting information and program content, and so on) used by the program. Here, the storage unit 140 is integrated with the terminal 10 in the example illustrated in FIG. 2, but the storage unit 140 may be formed separately from the terminal 10.

The sound output unit 150 has a function to output sound generated by the reproduction of program content. For example, the sound output unit 150 includes, for example, a speaker. Here, the sound output unit 150 is integrated with the terminal 10 in the example illustrated in FIG. 2, but the sound output unit 150 may be formed separately from the terminal 10. In a case where the sound output unit 150 is formed separately from the terminal 10, for example, the sound output unit 150 may be a headphone or an earphone, and so on.

The display unit 160 displays various kinds of information according to control by the display control unit 112. For example, the display unit 160 includes an LCD (Liquid Crystal Display) and an organic EL (Electroluminescence) display apparatus, and so on. Here, the display unit 160 is integrated with the terminal 10 in the example illustrated in FIG. 2, but the display unit 160 may be formed separately from the terminal 10.

A functional configuration example of the terminal 10 according to an embodiment of the present disclosure has been described above.

[1-3. Functional Configuration Example of Information Processing Apparatus]

Figure 3:
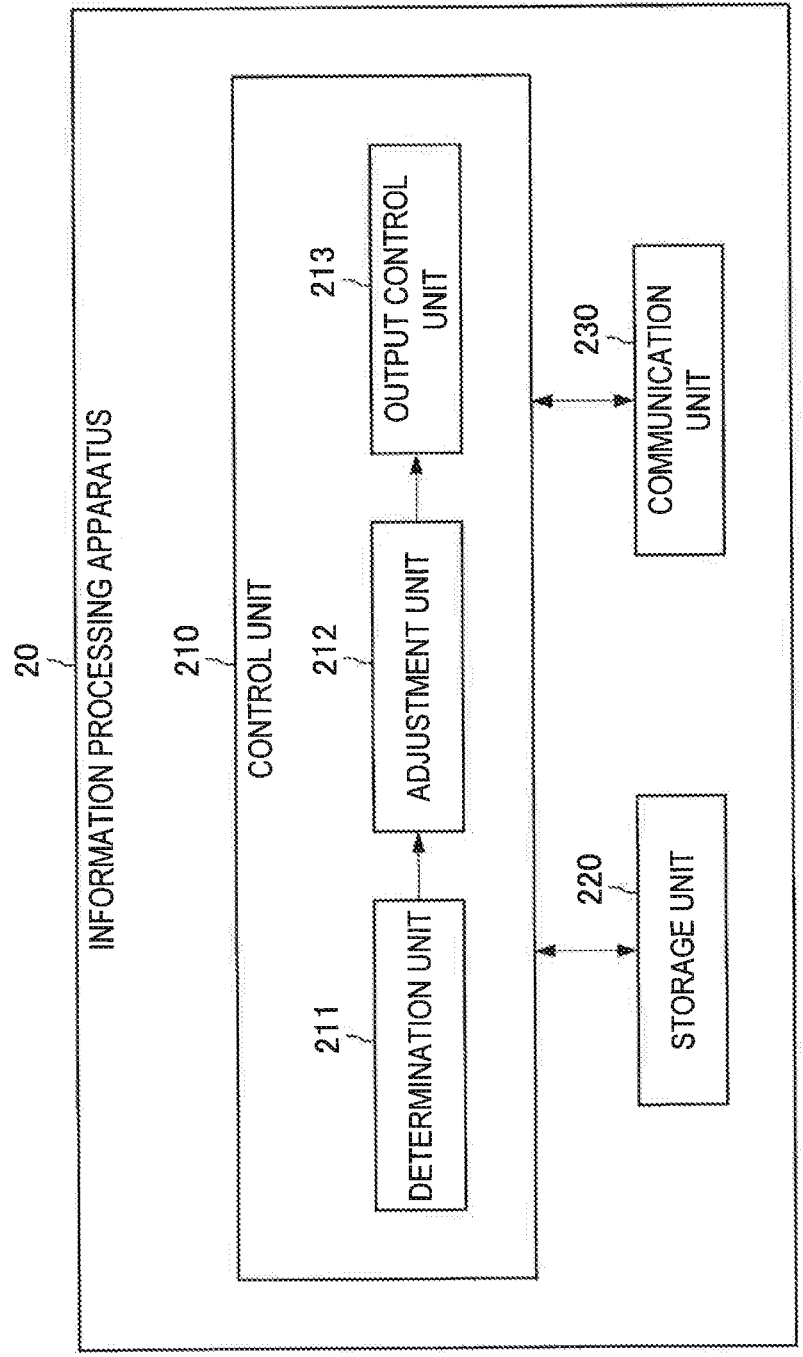
FIG. 3 is a diagram illustrating a functional configuration example of an information processing apparatus according to an embodiment of the present disclosure.

Subsequently, a functional configuration example of the information processing apparatus 20 according to an embodiment of the present disclosure is described. FIG. 3 is a diagram illustrating the functional configuration example of the information processing apparatus 20 according to the embodiment of the present disclosure. As illustrated in FIG. 3, the information processing apparatus 20 includes a control unit 210, a storage unit 220 and a communication unit 230.

For example, the control unit 210 corresponds to a processor such as a CPU. The control unit 210 fulfills various functions included in the control unit 210 by executing a program stored in the storage unit 220 or other storage media. The control unit 210 includes the determination unit 211, an adjustment unit 212 and the output control unit 213.

The determination unit 211 determines whether to urge user A to execute an action corresponding to actions executed by different users, on the basis of the relationships between user A and the different users. The determination unit 211 acquires a determination result by the determination. The different users correspond to users different from user A, and correspond to one or multiple users of users B to E. The different terminals are terminals used by the different users respectively.

For example, an action corresponding to an action executed by a different user may be the same action as the action executed by the different user. Alternatively, the action corresponding to the action executed by the different user may be an action related to the action executed by the different user. As related actions, for example, a case where consecutive programs as a story are targeted, a case where programs with the same cast or producer are targeted or a case where programs of the same genre are targeted is assumed.

Here, for example, the action executed by user A is an action executed on the terminal 10A by user A. Moreover, the action executed by the different user is an action executed on a different terminal by the different user, and, for example, an action executed by user B is an action executed on the terminal 10B by user B. Similarly, actions executed by users C to E respectively are actions executed on the terminals 10C to 10E by users C to E respectively.

Moreover, the kind of actions executed on the different terminals by the different users is not especially limited. For example, the actions may include at least a program recording reservation as mainly described in the present embodiment. Alternatively, as for the actions, the actions executed on the different terminals by the different users may include at least viewing a program as mainly described in a modification example of the present embodiment.

Moreover, the timing at which the actions are executed on the different terminals by the different users is not especially limited. For example, the actions executed on the different terminals by the different users may include at least any one of an action to be executed, a currently executed action and an already executed action. That is, the actions executed by the different users may be actions to be executed, currently executed actions or already executed actions.

A technique of determination by the determination unit 211 is not especially limited. For example, in a case where the different user denotes user B and a relationship point indicating the relationship between user A and user B is equal to or greater than a threshold, the determination unit 211 only has to make an determination to urge user A to execute an action corresponding to an action executed by user B.

Figure 4:
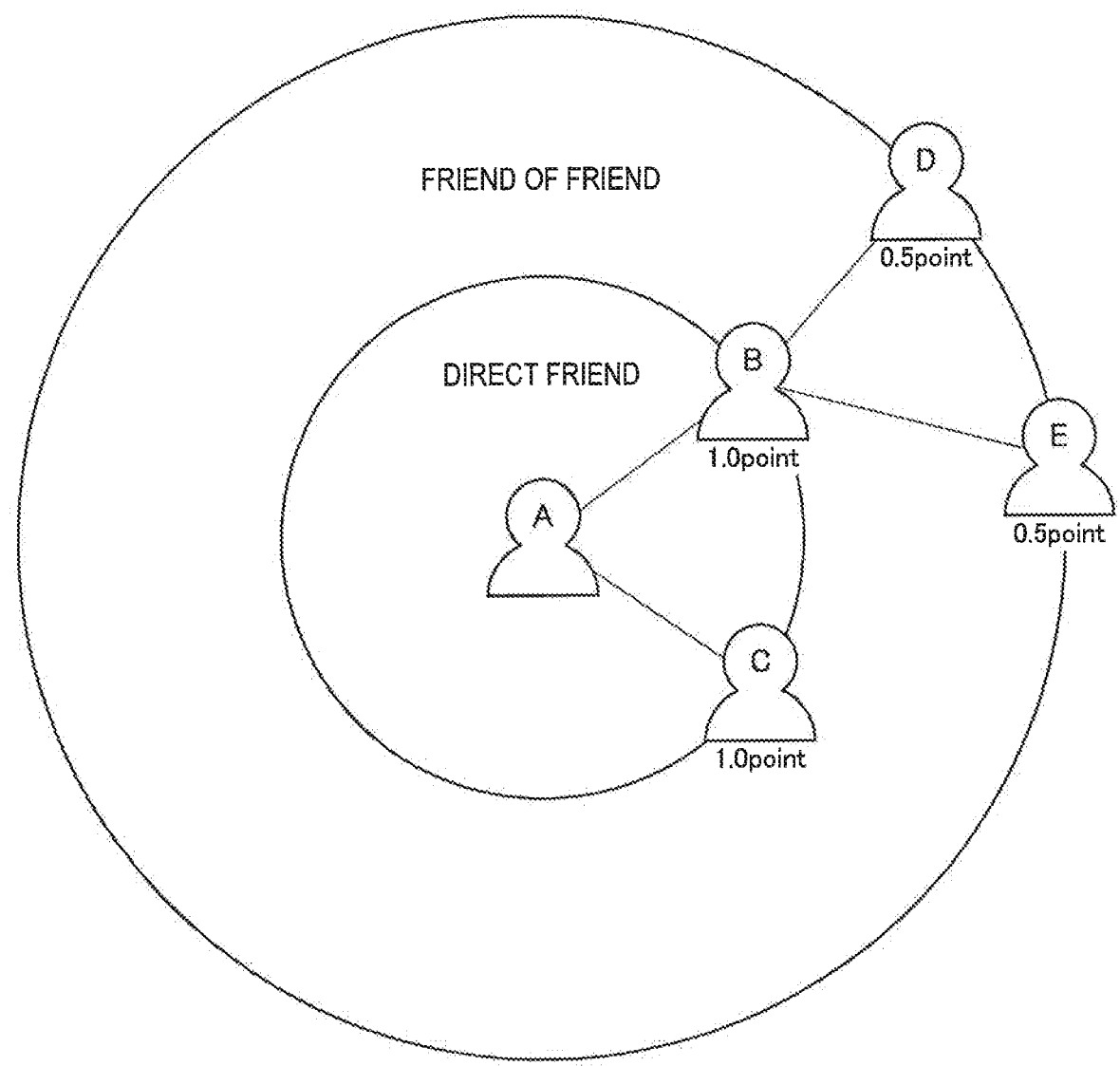
FIG. 4 is a diagram to describe the relationships between a user and different users.

Moreover, for example, in a case where the different users denote users B to E and the total value of relationship points indicating the relationship between each different user and user A is equal to or greater than a threshold, the determination unit 211 may make a determination to urge user A to execute an action corresponding to an action executed by the different user. As illustrated in FIG. 4, the relationship point may have a larger value as the relationship between user A and the different user is stronger.

The adjustment unit 212 adjusts a predetermined parameter according to the number of persons directly related to user A among the different users. Various parameters are assumed as a predetermined parameter. For example, the adjustment unit 212 only has to adjust a threshold according to the number of persons directly related to user A among the different users. For example, a way of adjusting the threshold is not especially limited, but, for example, the adjustment unit 212 may increase the threshold in a case where the number of persons directly related to user A among the different users exceeds an upper limit value. By doing so, the frequency at which the total value of relationship points is equal to or greater than the threshold and user A is urged to execute an action corresponding to an action executed by a different user can be prevented from increasing too much.

Moreover, other parameters than the threshold may be adjusted instead of the threshold. For example, according to the number of persons directly related to user A among the different users, the adjustment unit 212 may adjust respective relationship points indicating the relationships between user A and persons indirectly related to user A among the different users.

A way of adjusting the relationship points is not especially limited, but, for example, in a case where the number of persons directly related to user A among the different users exceeds an upper limit value, the adjustment unit 212 may decrease respective relationship points indicating the relationships between user A and persons indirectly related to user A among the different users. By doing so, the frequency at which the total value of relationship points is equal to or greater than the threshold and user A is urged to execute an action corresponding to an action executed by a different user can be prevented from increasing too much.

On the other hand, in a case where the number of persons directly related to user A among the different users falls below a lower limit value, the adjustment unit 212 may increase respective relationship points indicating the relationships between user A and persons indirectly related to user A among the different users. By doing so, the frequency at which the total value of relationship points is less than the threshold and user A is urged to execute an action corresponding to an action executed by a different user can be prevented from decreasing too much.

Moreover, the adjustment unit 212 may adjust a predetermined parameter on the basis of the history of actions executed by user A in the past. For example, the adjustment unit 212 may adjust a relationship point on the basis of the history of the actions executed by user A in the past. To be more specific, for example, in a case where a favorite range of user A (for example, a genre, a cast, a program theme, a keyword and a broadcasting time zone, and so on) can be specified on the basis of the history of actions executed by user A in the past, the adjustment unit 212 may increase the relationship point about the range.

Here, the adjustment unit 212 may adjust a predetermined parameter on the basis of the history of an action executed by a different user in the past. For example, the adjustment unit 212 may adjust a relationship point on the basis of the history of the action executed by the different user in the past.

The output control unit 213 performs control such that display corresponding to the determination result acquired by the determination unit 211 is performed. To be more specific, the output control unit 213 performs control such that the display according to this determination result is displayed on the display unit 160 of the terminal 10A. For example, this display control is realized when the output control unit 213 provides this determination result to the terminal 10A.

The storage unit 220 stores a program to operate the control unit 210, by the use of a storage medium such as a semiconductor memory and a hard disk. Moreover, for example, the storage unit 220 can store various kinds of data (for example, various kinds of setting information and program content, and so on) used by the program. Here, the storage unit 220 is integrated with the information processing apparatus 20 in the example illustrated in FIG. 3, but the storage unit 220 may be formed separately from the information processing apparatus 20.

The communication unit 230 can perform communication with the terminal 10, the program information provision server 30 and the content provision server 40 through the network 50. For example, the communication unit 230 can receive recording reservation information from the terminal 10. Moreover, for example, the communication unit 230 can transmit screen information corresponding to the recording reservation information to the terminal 10. Here, the communication unit 230 is integrated with the information processing apparatus 20 in the example illustrated in FIG. 3, but the communication unit 230 may be formed separately from the information processing apparatus 20.

A functional configuration example of the information processing apparatus 20 according to an embodiment of the present disclosure has been described above.

[1-4. Details of Function of Information Processing System]

Subsequently, details of the function of the information processing apparatus 20 according to an embodiment of the present disclosure are described. FIG. 4 is a diagram to describe the relationships between the user and different users. Here, as described above, an explanation is continued where the user to be paid attention to is assumed as user A and the different users are assumed as user B, user C, user D and user E.

As illustrated in FIG. 4, it is assumed that user A and user B satisfy a relationship of "direct friend". Similarly, it is assumed that user A and user C satisfy a relationship of "direct friend".

In this case, a predetermined point ("1.0 point" in the example illustrated in FIG. 4) is given to users corresponding to "direct friend" as a relationship point. Here, since a relationship of "direct friend" is merely one example of a direct relationship, other direct relationships may be used instead of "direct friend". Moreover, the magnitude of a relationship point given to users corresponding to "direct friend" is not especially limited.

Meanwhile, as illustrated in FIG. 4, in a case where user B who is a direct friend with user A and user D are direct friends, it is assumed that user A and user D satisfy a relationship of "friend of friend". Similarly, in a case where user B who is a direct friend with user A and user E are direct friends, it is assumed that user A and user E satisfy a relationship of "friend of friend".

In this case, a lower point ("0.5 points" in the example illustrated in FIG. 4) than users corresponding to "direct friend" is given to users corresponding to "friend of friend" as a relationship point. Since a relationship of "friend of friend" is merely one example of an indirect relationship, other indirect relationships may be used instead of "friend of friend". Moreover, the magnitude of a relationship point given to users corresponding to "friend of friend" is not especially limited.

Here, as for such a relationship point indicating the relationship between users, for example, it is possible to use the relationship (social graph) between users in an SNS (social networking service). However, a relationship point used in the information processing system 1 according to the present embodiment may be formed besides the social graph in an already existing SNS.

Figure 5:
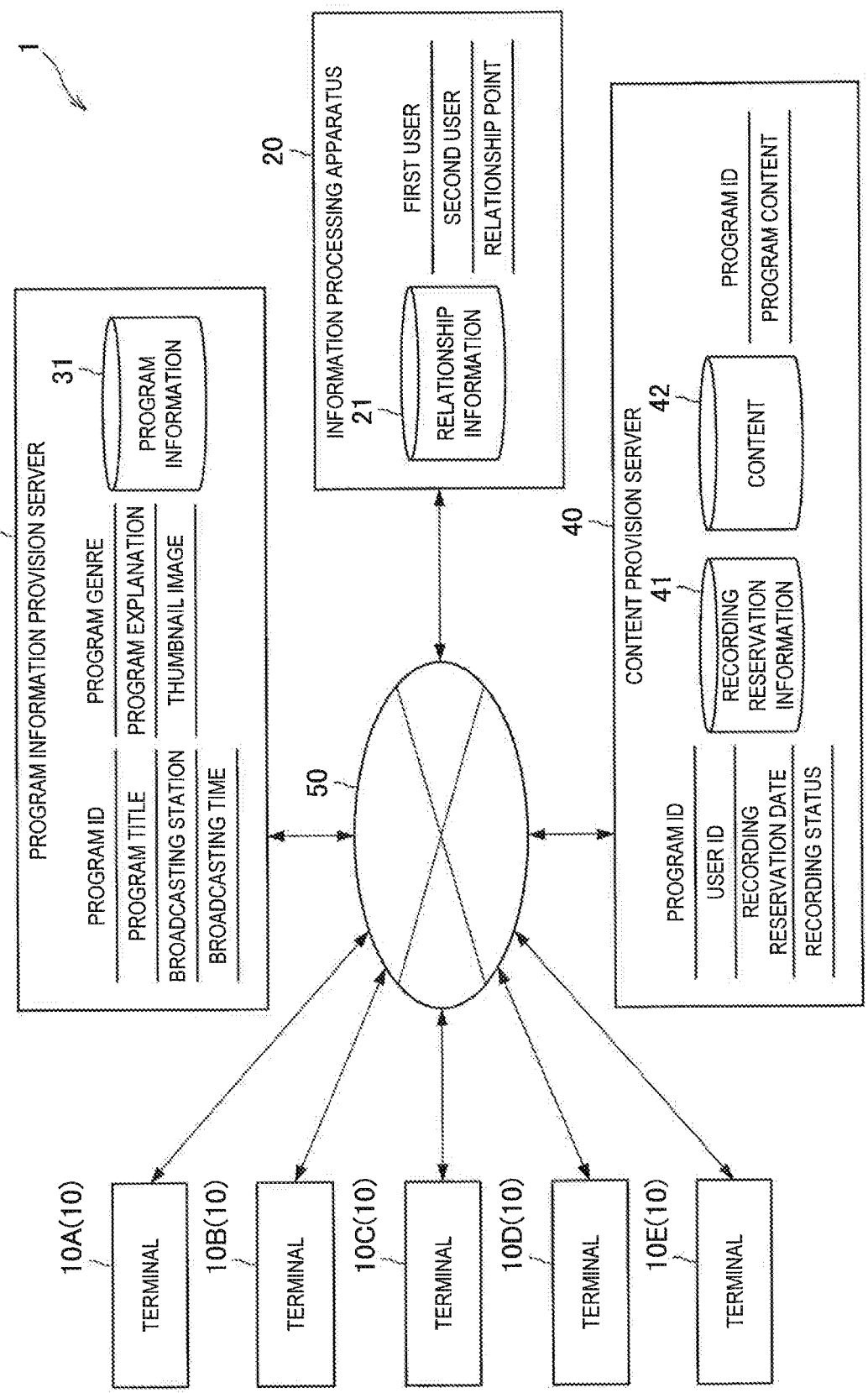
FIG. 5 is a diagram illustrating a detailed configuration example of an information processing system according to an embodiment of the present disclosure.

FIG. 5 is a diagram illustrating a detailed configuration example of the information processing system 1 according to an embodiment of the present disclosure. As illustrated in FIG. 5, relationship information 21, program information 31, recording reservation information 41 and content 42 are used in the information processing system 1. Here, there is no special limitation as to what apparatus is used to store each of these items of information. Moreover, in the following, a case where the recording reservation of program content is performed as an action executed by the user is described as an example.

The relationship information 21 is information in which "first user", "second user" and "relationship point" are associated. For example, "first user" and "second user" satisfy a relationship indicated by "relationship point". For example, the user ID to identify the first user only has to be used as "first user", and the user ID to identify the second user only has to be used as "second user". For example, the relationship information 21 is stored beforehand by the storage unit 220 of the information processing apparatus 20.

The program information 31 is information in which "program ID", "program title", "broadcasting station", "broadcasting time", "program genre", "program explanation" and "thumbnail image" are associated. Here, all of these items of information forming the program information 31 are not essential, and they may be properly included in the program information 31 according to the necessity. For example, the program information 31 is stored beforehand by the program information provision server 30.

The recording reservation information 41 is information in which "program ID", "user ID", "recording reservation date" and "recording status" are associated. For example, when receiving the provision of the program information 31 from the program information provision server 30 according to a user operation, the terminal 10 displays the program information 31 provided from the program information provision server 30 on the display unit 160. When the user who browses the program information 31 makes a program recording reservation, the program ID, the user ID, the recording reservation date and the recording status are output to the content provision server 40 as the recording reservation information 41. The output recording reservation information 41 is stored by the content provision server 40.

Here, for example, a comment from a recording person may be included in the recording status. Moreover, the recording reservation information 41 and the content 42 are stored by the same content provision server 40 in the example illustrated in FIG. 5, but the recording reservation information 41 and the content 42 may be stored by different servers.

The content 42 is information in which "program ID" and "program content" are associated. For example, in a case where the program ID to identify program content is specified by the terminal 10, the content provision server 40 can provide the program content associated with the program ID to the terminal 10. For example, the content 42 is stored beforehand by the content provision server 40.

Here, for example, a case where user A who uses the terminal 10A performs an operation to confirm the reservation recording state is assumed. In this case, in the information processing apparatus 20, the determination unit 211 determines whether to urge user A to make a recording reservation according to recording reservations made by different users, on the basis of the relationships between user A and the different users.

For example, in a case where the total value of relationship points indicating the relationship between each different user and user A is equal to or greater than a threshold, the determination unit 211 may make a determination to urge user A to make a recording reservation corresponding to a recording reservation made by the different user.

For example, in a case where the threshold is "1.0 point" and user B makes a recording reservation of program X, as illustrated in FIG. 4, a relationship point indicating the relationship between user A and user B is "1.0 point." Therefore, since the total value of the relationship points is equal to or greater than the threshold, the determination unit 211 makes a determination to urge user A to make a recording reservation of program X. Then, the output control unit 213 performs control such that information on program X is displayed. For example, even in a case where user C instead of user B makes a recording reservation of program X, the similar result is acquired.

Meanwhile, in a case where user D instead of user B makes a recording reservation of program X, as illustrated in FIG. 4, a relationship point indicating the relationship between user A and user D is "0.5 points." Therefore, since the total value of the relationship points is less than the threshold, the determination unit 211 makes a determination not to urge user A to make a recording reservation of program X. Then, the output control unit 213 performs control such that information on program X is not displayed. For example, even in a case where user E instead of user D makes a recording reservation of program X, the similar result is acquired.

Figure 6:
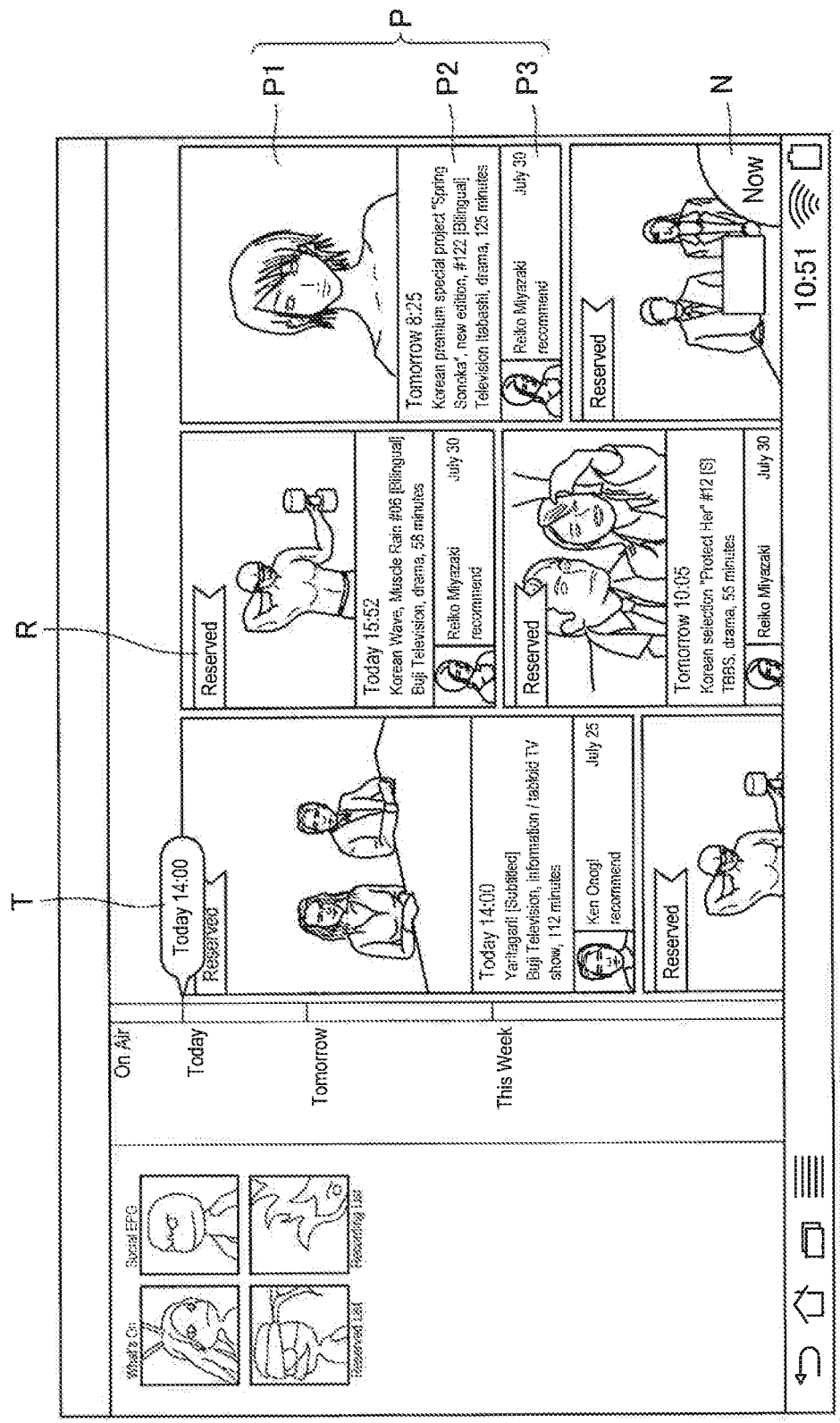
FIG. 6 is a diagram illustrating an example of a program selection screen.

FIG. 6 is a diagram illustrating an example of a program selection screen. For example, in a case where user A who uses the terminal 10A may perform an operation to confirm a reservation recording state, the program selection screen is displayed and controlled by the display control unit 112. As illustrated in FIG. 6, information P on a program is included in the program selection screen, and thumbnail image P1, program detailed information P2 and recording person comment P3 are included in information P on the program. As described above, in a case where information on program X is controlled so as to be displayed, the information on program X is incorporated in the program selection screen by the display control unit 112.

Here, for example, thumbnail image P1 is acquired by the display control unit 112 from "thumbnail information" included in the program information 31. Moreover, program detailed information P2 is acquired by the display control unit 112 from "program title", "broadcasting station", "program genre" and "broadcasting time" included in the program information 31. Moreover, recording person comment P3 is acquired by the display control unit 112 from "recording status" included in the recording reservation information 41.

Current time T indicates a position at the current time in the program selection screen, and, when a user operation to select current time change button N is performed by user A, the display control unit 112 scrolls the program selection screen to the position in which current time T appears. Moreover, as illustrated in FIG. 6, a program for which a recording reservation is made by user A may be controlled by the display control unit 112 such that reservation completion mark R is displayed. On the other hand, a program for which a recording reservation is not made by user A may be controlled by the display control unit 112 such that reservation completion mark R is not displayed.

The program selection screen is displayed in this way, and, in a case where user A wants to make a recording reservation of program X as a result of browsing information on program X incorporated in the program selection screen, it becomes possible to make a recording reservation of that program X by performing an operation to select that program X.

Here, the size of information P on a program may be different depending on the program. For example, the size of information P on the program may be larger as the total value of relationship points is larger, or it may be larger as the broadcasting time is longer. Moreover, in a case where a free space is caused in the program selection screen, information on the program by on-demand service may be incorporated in the free space.

Figure 7:
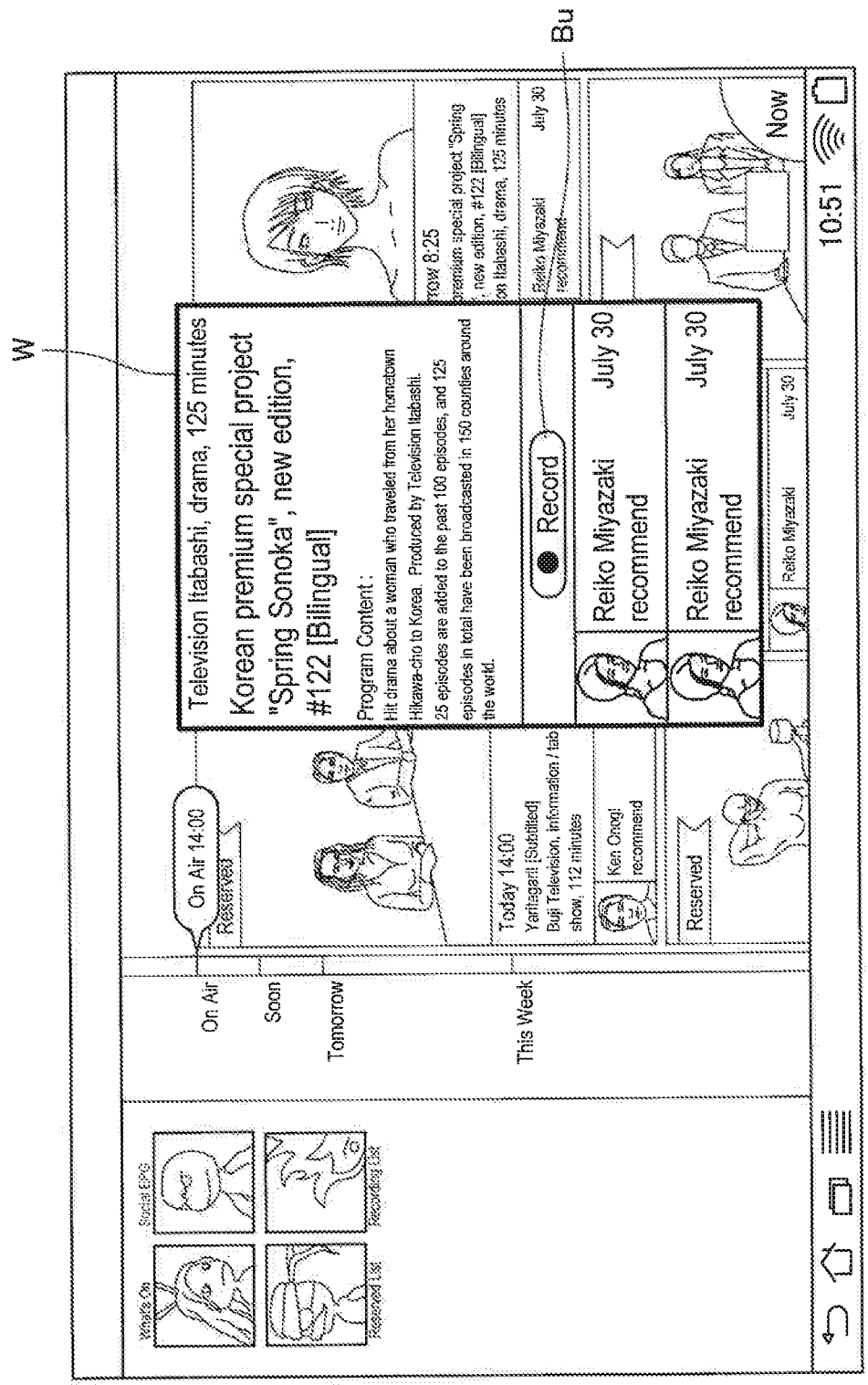
FIG. 7 is a diagram illustrating an example of a recording reservation screen.

FIG. 7 is a diagram illustrating an example of a recording reservation screen. For example, when an operation to select program X is performed by user A in the program selection screen illustrated in FIG. 6, the recording reservation screen illustrated in FIG. 7 is controlled so as to be displayed by the display control unit 112. For example, in a case where the operation unit 120 includes a touch panel, the operation to select program X is performed by a touch operation with respect to the information on program X incorporated in the program selection screen.

As illustrated in FIG. 7, detailed window W of program X may be included in the recording reservation screen. Moreover, as illustrated in FIG. 7, "program explanation" included in the program information 31 may be included in detailed window W. In the recording reservation screen, when an operation to select recording reservation button Bu is performed by user A, processing to make a recording reservation of program X is performed by the processing unit 113.

Here, in a case where an operation to select a reserved program is performed by user A, a recording reservation cancellation screen may be displayed. A detailed window of the program may be included in the recording reservation cancellation screen. The detailed window may include "program explanation" included in the program information 31. In a case where an operation to select a recording reservation cancellation button is performed by user A in the recording reservation cancellation screen, processing to cancel a recording reservation of the program may be performed by the processing unit 113.

Details of the function of the information processing apparatus 20 according to an embodiment of the present disclosure have been described above.

[1-5. Operation of Information Processing Apparatus]

Figure 8:
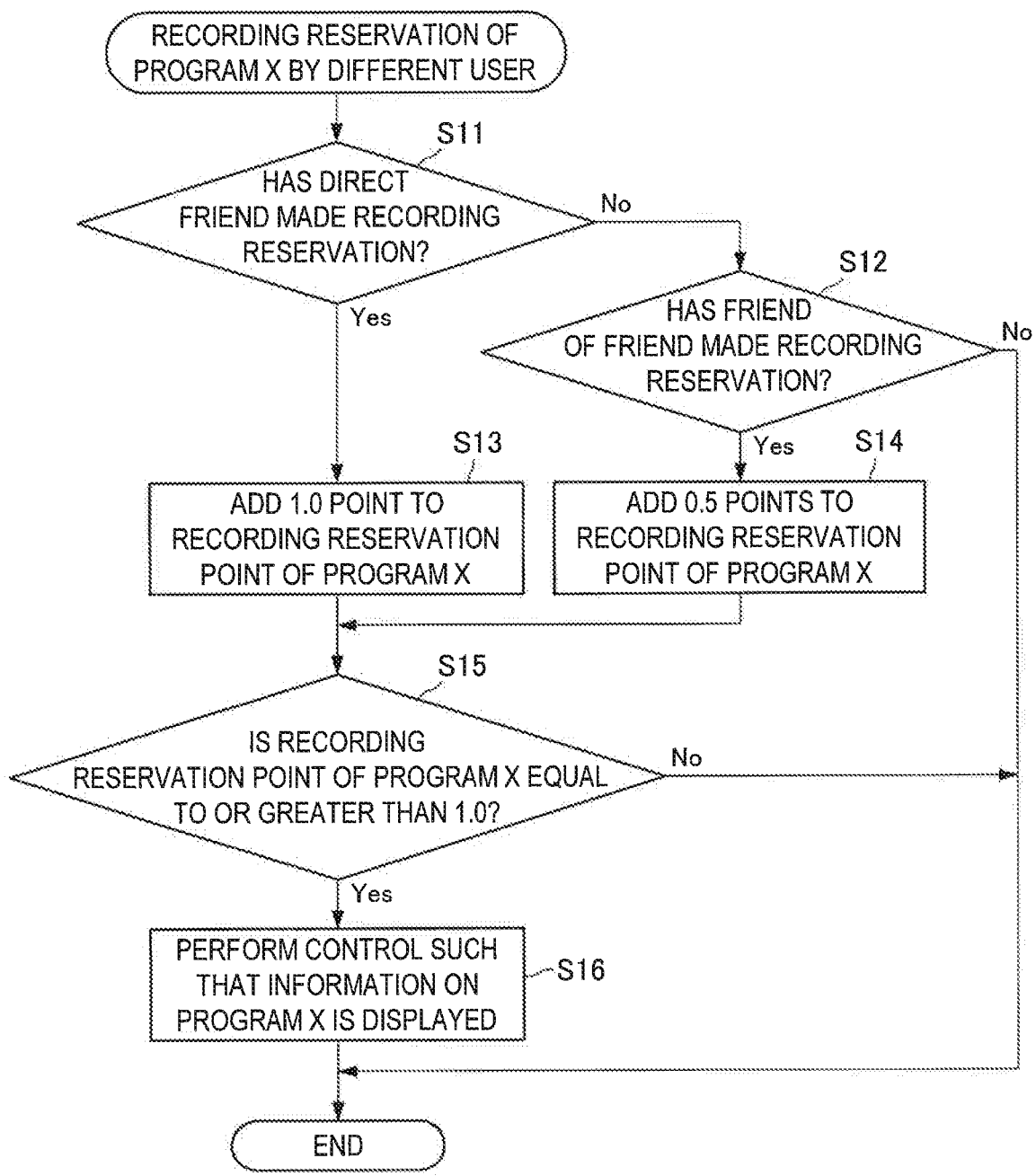
FIG. 8 is a diagram illustrating one example of the flow of operation of an information processing apparatus according to an embodiment of the present disclosure.

Subsequently, the operation of the information processing apparatus 20 according to an embodiment of the present disclosure is described. FIG. 8 is a diagram illustrating one example of the operation flow of the information processing apparatus 20 according to the embodiment of the present disclosure. Here, the operation flow illustrated in FIG. 8 is merely one example of the operation flow of the information processing apparatus 20 according to the embodiment of the present disclosure. Therefore, the operation of the information processing apparatus 20 according to the embodiment of the present disclosure is not limited to the example illustrated in FIG. 8.

As illustrated in FIG. 8, when a recording reservation of program X is made by a different user, the determination unit 211 determines whether a direct friend of user A has made the recording reservation of program X (S11). In a case where a direct friend of user A has made the recording reservation of program X ("Yes" in S11), the determination unit 211 adds "1.0 point" to the recording reservation point of program X, and it proceeds to S15 (S13). The direct friend of user A corresponds to one example of a person who is directly related to user A.

On the other hand, in a case where a person who is different from the direct friend of user A has made the recording reservation of program X ("No" in S11), the determination unit 211 determines whether a friend of the friend of user A has made the recording reservation of program X (S12). The friend of the friend of user A corresponds to one example of a person who is indirectly related to user A.

In a case where the friend of the friend of user A has made the recording reservation of program X ("Yes" in S12), the determination unit 211 adds "0.5 points" to the recording reservation point of program X (S14), and it proceeds to S15. Meanwhile, in a case where a person who is different from the friend of the friend of user A has made the recording reservation of program X ("No" in S12), the determination unit 211 waits until a recording reservation of program X is made by a different user.

Subsequently, the determination unit 211 determines whether the recording reservation point of program X is equal to or greater than "1.0 point" corresponding to one example of a threshold (S15). In a case where the recording reservation point of program X is less than "1.0 point" ("No" in S15), the output control unit 213 waits until a recording reservation of program X is made by a different user. On the other hand, in a case where the recording reservation point of program X is equal to or greater than "1.0 point" ("Yes" in S15), the output control unit 213 performs control such that information on program X is displayed (S16), and waits until a recording reservation of program X is made by a different user.

In a case where the information on program X is controlled by the output control unit 213 so as to be displayed, the information on program X is displayed on the display unit 160 according to control by the display control unit 112 of the terminal 10A. For example, the information on program X is incorporated in the program selection screen illustrated in FIG. 6. Afterward, in a case where an operation to select program X in the program selection screen is performed by user A, the processing unit 113 can make a recording reservation of program X.

The operation of the information processing apparatus 20 according to an embodiment of the present disclosure has been described above.

2. Modification Example

Subsequently, a modification example of an embodiment of the present disclosure is described.

[2-1. Details of Function of Information Processing System]

Figure 9:
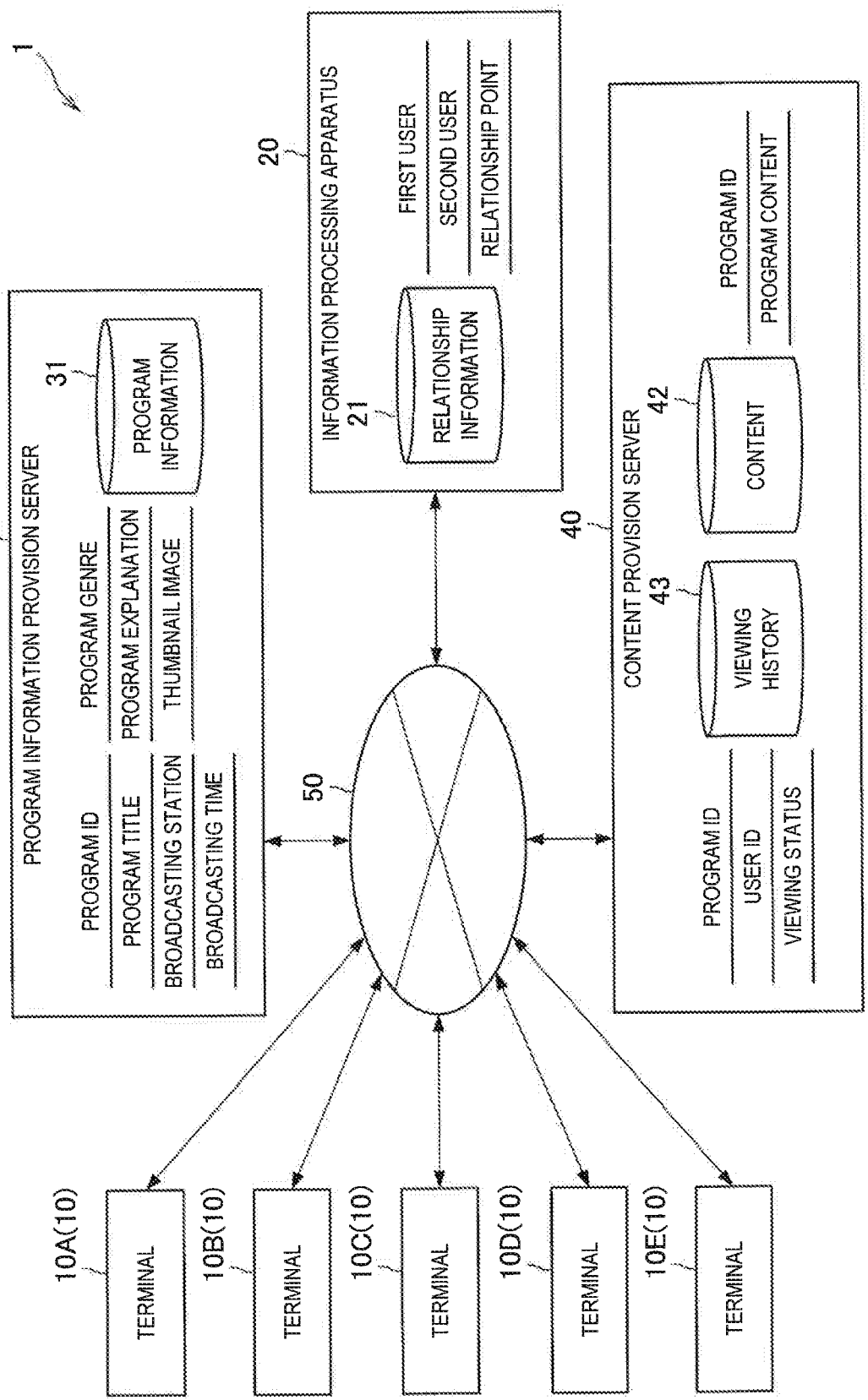
FIG. 9 is a diagram illustrating a detailed configuration example of an information processing system according to a modification example of an embodiment of the present disclosure.

First, details of the function of the information processing system 1 according to a modification example of an embodiment of the present disclosure are described. FIG. 9 is a diagram illustrating a detailed configuration example of the information processing system 1 according to the modification example of the embodiment of the present disclosure. As illustrated in FIG. 9, in the information processing system 1 according to the modification example of the embodiment of the present disclosure, a viewing history 43 is used instead of the recording reservation information 41. Here, there is no special limitation as to what apparatus is used to store the viewing history 43. Moreover, in the following, a case where program content is viewed as an action executed by the user is described as an example.

The viewing history 43 is information in which "program ID", "user ID" and "viewing status" are associated. For example, when the program information 31 is provided from the program information provision server 30 according to a user operation, the terminal 10 displays the program information 31 provided from the program information provision server 30 on the display unit 160. When the user who browses the program information 31 views a program, the program ID, the user ID and the viewing status are output to the content provision server 40 as the viewing history 43. The output viewing history 43 is stored by the content provision server 40.

Here, for example, the viewing status may include comment from a viewer. Moreover, the viewing history 43 and the content 42 are stored by the same content provision server 40 in the example illustrated in FIG. 9, but the viewing history 43 and the content 42 may be stored by different servers.

Here, for example, a case where user A who uses the terminal 10A performs an operation to confirm the viewing state is assumed. In this case, in the information processing apparatus 20, the determination unit 211 determines whether to urge user A to perform program viewing corresponding to program viewing performed by a different user, on the basis of the relationship between user A and the different user.

For example, in a case where the total value of relationship points indicating the relationship between each different user and user A is equal to or greater than a threshold, the determination unit 211 may make a determination to urge user A to perform the program viewing corresponding to program viewing performed by the different user.

For example, in a case where the threshold is "1.0 point" and user B views program X, a relationship point indicating the relationship between user A and user B is "1.0 point" as illustrated in FIG. 4. Therefore, since the total value of the relationship points is equal to or greater than the threshold, the determination unit 211 makes a determination to urge user A to view program X. Then, the output control unit 213 performs control such that the information on program X is displayed. For example, even in a case where user C instead of user B views program X, the similar result is acquired.

Meanwhile, in a case where user D instead of user B views program X, a relationship point indicating the relationship between user A and user D is "0.5 points" as illustrated in FIG. 4, Therefore, since the total value of the relationship points is less than the threshold, the determination unit 211 makes a determination not to urge user A to view program X. Then, the output control unit 213 performs control such that the information on program X is not displayed. For example, even in a case where user E instead of user D views program X, the similar result is acquired.

Details of the function of the information processing apparatus 20 according to a modification example of an embodiment of the present disclosure have been described above.

[2-2. Operation of Information Processing Apparatus]

Figure 10:
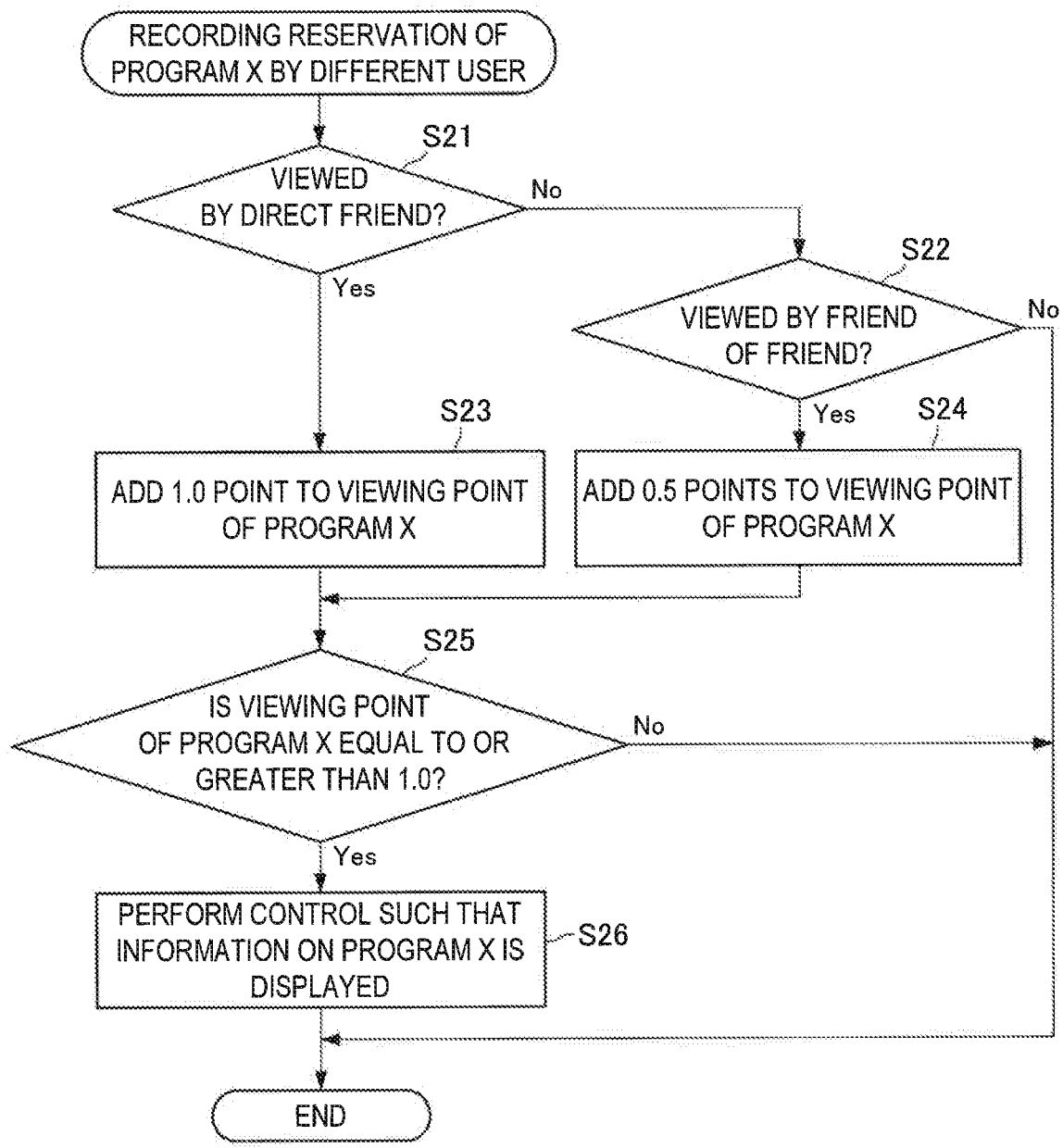
FIG. 10 is a diagram illustrating one example of the flow of operation of an information processing apparatus according to a modification example of an embodiment of the present disclosure.

Subsequently, the operation of the information processing apparatus 20 according to a modification example of an embodiment of the present disclosure is described. FIG. 10 is a diagram illustrating one example of the operation flow of the information processing apparatus 20 according to the modification example of the embodiment of the present disclosure. Here, the operation flow illustrated in FIG. 10 is merely one example of the operation flow of the information processing apparatus 20 according to the modification example of the embodiment of the present disclosure. Therefore, the operation of the information processing apparatus 20 according to the modification example of the embodiment of the present disclosure is not limited to the example illustrated in FIG. 10.

As illustrated in FIG. 10, when program X is viewed by a different user, the determination unit 211 determines whether a direct friend of user A has viewed program X (S21). In a case where the direct friend of user A has viewed program X ("Yes" in S21), the determination unit 211 adds "1.0 point" to the viewing point of program X (S23), and it proceeds to S25. The direct friend of user A corresponds to one example of a person who is directly related to user A.

On the other hand, in a case where a person who is different from the direct friend of user A has viewed program X ("No" in S21), the determination unit 211 determines whether a friend of the friend of user A has viewed program X (S22). The friend of the friend of user A corresponds to one example of a person who is indirectly related to user A.

In a case where the friend of the friend of user A has viewed program X ("Yes" in S22), the determination unit 211 adds "0.5 points" to the viewing point of program X (S24), and it proceeds to S25. On the other hand, in a case where a person who is different from the friend of the friend of user A has viewed program X ("No" in S22), the determination unit 211 waits until program X is viewed by a different user.

Subsequently, the determination unit 211 determines whether the viewing point of program X is equal to or greater than "1.0 point" corresponding to one example of a threshold (S25). In a case where the viewing point of program X is less than "1.0 point" ("No" in S25), the output control unit 213 waits until program X is viewed by a different user. On the other hand, in a case where the viewing point of program X is equal to or greater than "1.0 point" ("Yes" in S25), the output control unit 213 performs control such that information on program X is displayed (S26), and waits until program X is viewed by a different user.

In a case where the information on program X is controlled by the output control unit 213 so as to be displayed, the information on program X is displayed on the display unit 160 according to control by the display control unit 112 of the terminal 10A. For example, the information on program X is incorporated in a program selection screen. Afterward, in a case where an operation to select program X in the program selection screen is performed by user A, the processing unit 113 can cause user A to view program X by reproducing program X.

The operation of the information processing apparatus 20 according to a modification example of an embodiment of the present disclosure has been described above.

3. Effect

Figure 11:
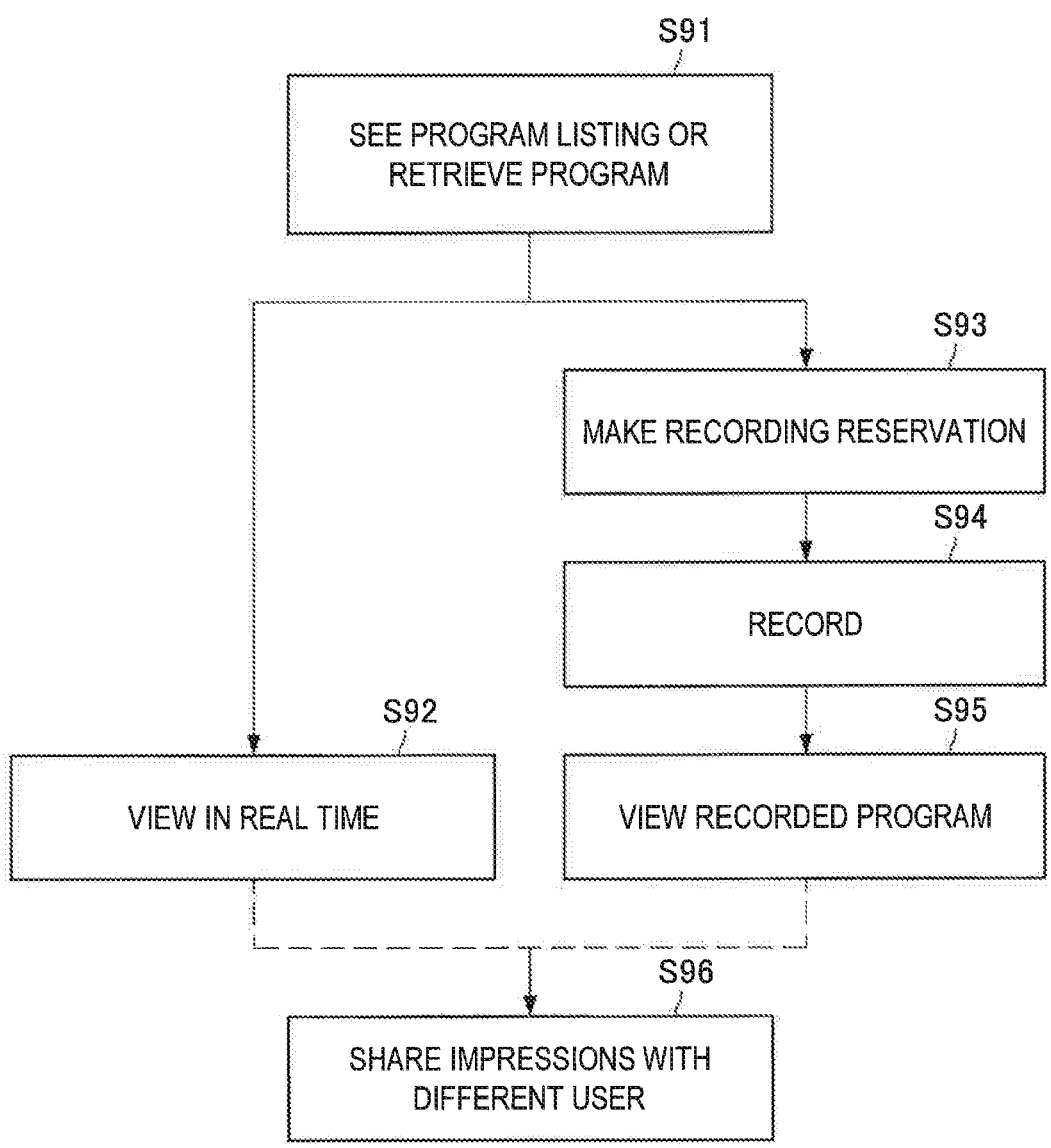
FIG. 11 is a diagram illustrating an example of a general play cycle.

Subsequently, an effect provided by the information processing system 1 of an embodiment of the present disclosure is described. FIG. 11 is a diagram illustrating an example of a general play cycle. As illustrated in FIG. 11, in a general play cycle, first, the user sees a program listing or the user retrieves a program (S91). Subsequently, the user views the program in real time (S92) and the play cycle proceeds to S96. Alternatively, the user makes a recording reservation of the program (S93), performs recording (S94) and views a recorded program (S95), and the play cycle proceeds to S96. Subsequently, the user shares impressions with respect to the program with a different user (S96).

Figure 12:
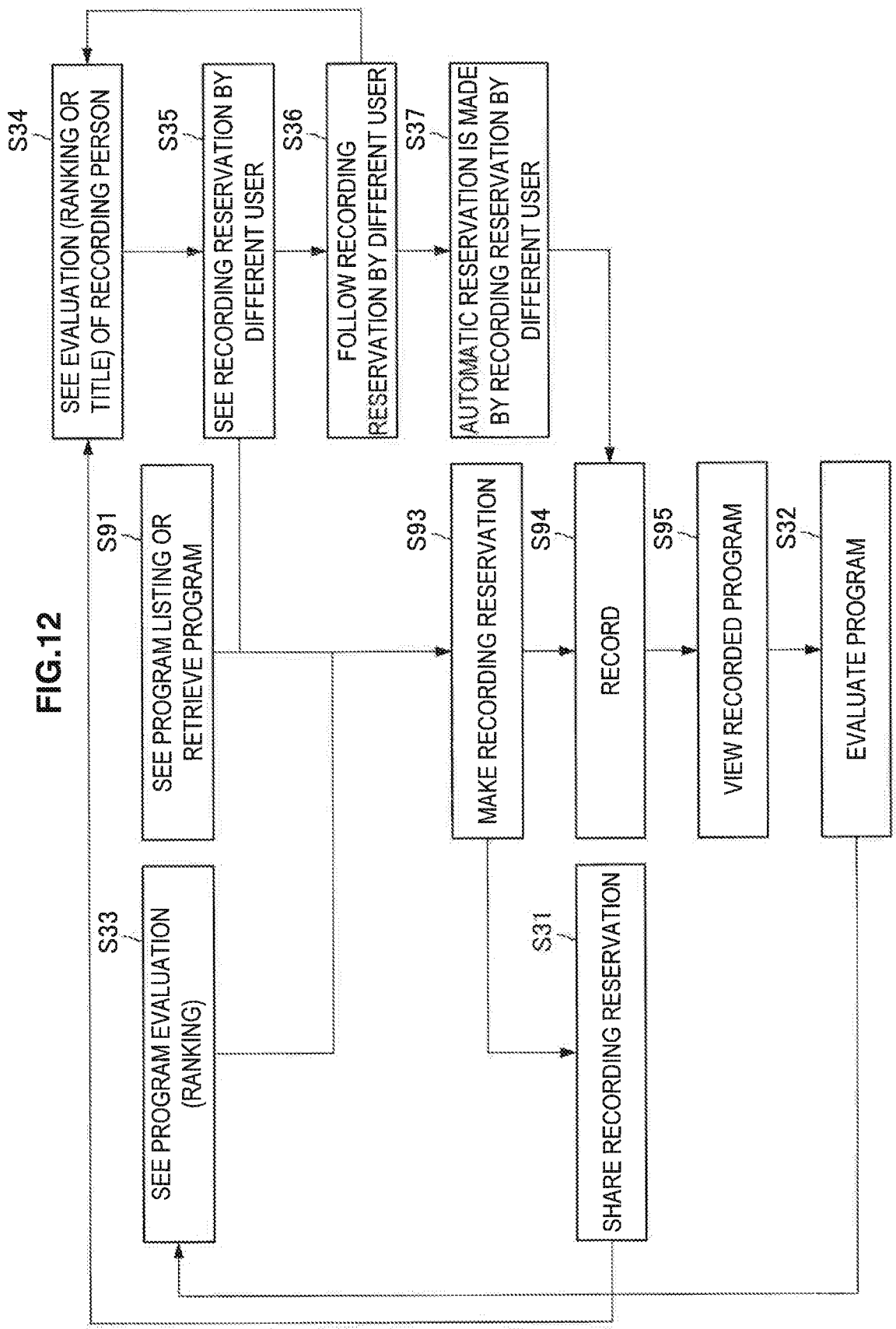
FIG. 12 is a diagram illustrating an example of a play cycle in a case where an information processing system according to an embodiment of the present disclosure is used.

Meanwhile, FIG. 12 is a diagram illustrating an example of a play cycle in a case where the information processing system 1 according to an embodiment of the present disclosure is used. As illustrated in FIG. 12, in a case where the information processing system 1 according to the embodiment of the present disclosure is used, when a recording reservation of a program is made (S93), while seeing evaluation of a recording person (ranking with respect to the recording person, or whether he/she is a recording person with title) (S34), it is possible to see a recording reservation by a different user (S33) and see program evaluation (ranking) (S35). The recording reservation at this time can be shared with the different user (S31).

In a case where the recording reservation is shared by the user, evaluation with respect to a recording person by the different user is performed. In a case where a recording reservation by the different user is followed (S36), a reservation may be automatically made by the recording reservation by the different user (S37). Moreover, in a case where the recording reservation by the different user is followed (S36), evaluation with respect to the recording person by the user may be performed. In the case of viewing the recorded program (S95), the user evaluates the program (S32) and allows the different user to see the evaluation.

As illustrated in FIG. 12, according to an embodiment of the present disclosure, it is possible to increase touch points by the user in a play cycle, and it becomes easy for the user to find a program meeting the user's preference. In the touch points, user ranking corresponding to the number of recording reservations (or program viewing) shared with the different user or the number of recording reservations followed by different users, and so on, may be displayed on the terminal 10, title given to the user may be displayed on the terminal 10 or a program with a large number of recording reservations (or viewing) may be displayed on the terminal 10.

4. Conclusion

As described above, according to an embodiment of the present disclosure, it is possible to provide an information processing apparatus including: a determination unit configured to determine whether to urge a user who uses a terminal to execute an action corresponding to an action executed by a different user who uses a different terminal, based on the relationship between the user and the different user, and acquire a determination result; and an output control unit configured to perform control such that display corresponding to the determination result is performed.

According to such a configuration, when the action executed by the different user is presented to the user, a technique that can control presentation taking into account the relationship between the different user and the user is realized.

Moreover, as described above, a relationship point may have a larger value as the relationship between the user and the different user is stronger. According to such a configuration, the frequency at which the user is urged to execute an action corresponding to an action executed by the different user can be prevented from increasing too much. Moreover, according to such a configuration, in a case where the frequency at which the user is urged to execute the action corresponding to the action executed by the different user is less, since the user tries to enhance the relationship with the different user, an effect of attracting social graph expansion is expected.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, each step in the operation example of the information processing apparatus of this specification is not necessarily performed in time series in accordance with the order described as the sequence diagram. For example, each step in the operation example of the information processing apparatus may be processed in an order different from the order described as the sequence diagram or may be processed in a parallel manner.

Moreover, a program for causing hardware built in a computer, such as CPU, ROM, and RAM, to demonstrate functions equivalent to the configuration of the terminals and the information processing apparatus described above can also be created. Moreover, a recording medium which records the program and which can be read by a computer may also be provided.

Additionally, the present technology may also be configured as below.

(1)
An information processing apparatus including:
a determination unit configured to determine whether to urge a user who uses a terminal to execute an action corresponding to an action executed by a different user who uses a different terminal, based on a relationship between the user and the different user, and acquire a determination result; and
an output control unit configured to perform control in a manner that display corresponding to the determination result is performed.

(2)
The information processing apparatus according to (1), wherein the action executed by the user is an action performed on the terminal, and the action executed by the different user is an action performed on the different terminal.

(3)
The information processing apparatus according to (1) or (2), wherein the action executed on the different terminal by the different user includes at least a recording reservation of content.

(4)
The information processing apparatus according to (1) or (2), wherein the action executed on the different terminal by the different user includes at least viewing of content.

(5)
The information processing apparatus according to any one of (1) to (4), wherein, when a relationship point indicating the relationship between the user and the different user is equal to or greater than a threshold, the determination unit makes a determination to urge the user to execute the action corresponding to the action executed by the different user.

(6)
The information processing apparatus according to any one of (1) to (4), wherein, when multiple persons are present as the different user and a total value of each relationship point indicating the relationship between the different user and the user is equal to or greater than a threshold, the determination unit makes a determination to urge the user to execute the action corresponding to the action executed by the different user.

(7)
The information processing apparatus according to (6), further including:
an adjustment unit configured to adjust a predetermined parameter according to the number of persons directly related to the user among the different users.

(8)
The information processing apparatus according to (7), wherein the adjustment unit adjusts the threshold according to the number of persons directly related to the user among the different users.

(9)
The information processing apparatus according to (8), wherein, when the number of persons directly related to the user among the different users exceeds an upper limit value, the adjustment unit increases the threshold.

(10)
The information processing apparatus according to (7), wherein the adjustment unit adjusts each relationship point indicating a relationship between the user and a person indirectly related to the user among the different users according to the number of persons directly related to the user among the different users.

(11)
The information processing apparatus according to (7), wherein, when the number of persons directly related to the user among the different users exceeds an upper limit value, the adjustment unit decreases each relationship point indicating a relationship between the user and a person indirectly related to the user among the different users.

(12)
The information processing apparatus according to (7), wherein, when the number of persons directly related to the user among the different users falls below a lower limit value, the adjustment unit increases each relationship point indicating a relationship between the user and a person indirectly related to the user among the different users.

(13)
The information processing apparatus according to (6), further including:
an adjustment unit configured to adjust a predetermined parameter based on a history of actions executed by the user in the past.

(14)
The information processing apparatus according to (13), wherein the adjustment unit adjusts the relationship point based on the history of the actions executed by the user in the past.

(15)
The information processing apparatus according to (6), wherein the relationship point has a larger value as the relationship between the user and the different user is stronger.

(16)
The information processing apparatus according to any one of (1) to (15), wherein the action executed on the different terminal by the different user includes at least any one of an action to be executed, a currently executed action and an already executed action.

(17)
An information processing method including:
determining whether to urge a user who uses a terminal to execute an action corresponding to an action executed by a different user who uses a different terminal, based on a relationship between the user and the different user, and acquiring a determination result; and
performing control in a manner that display corresponding to the determination result is performed.

(18)
A terminal including:
an acquisition unit configured to acquire a determination result indicating whether to urge a user who uses the terminal to execute an action corresponding to an action executed by a different user who uses a different terminal, based on a relationship between the user and the different user; and
a display control unit configured to perform control in a manner that display corresponding to the determination result is performed.

(19)
A control method including:
acquiring a determination result indicating whether to urge a user who uses a terminal to execute an action corresponding to an action executed by a different user who uses a different terminal, based on a relationship between the user and the different user; and
performing control in a manner that display corresponding to the determination result is performed.

(20)
A program that causes a computer to function as a terminal including:

an acquisition unit configured to acquire a determination result indicating whether to urge a user who uses the terminal to execute an action corresponding to an action executed by a different user who uses a different terminal, based on a relationship between the user and the different user; and a display control unit configured to perform control in a manner that display corresponding to the determination result is performed.

REFERENCE SIGNS LIST 1 information processing system
10 (10A to 10E) terminal
20 information processing apparatus
21 relationship information
30 program information provision server
31 program information
40 content provision server
41 recording reservation information
42 content
43 viewing history
50 network
110 control unit
111 acquisition unit
112 display control unit
113 processing unit
120 operation unit
130 communication unit
140 storage unit
150 sound output unit
160 display unit
210 control unit
211 determination unit
212 adjustment unit
213 output control unit
220 storage unit
230 communication unit
A to E user

The invention claimed is:

1. An information processing apparatus comprising:
a determination unit configured to
determine whether to display a recommendation to a user who uses a terminal to execute a recommended action corresponding to an action executed by at least one different user of a plurality of different users who uses at least one different terminal, based on a total value of relationship points for the at least one different user,
wherein the total value of the relationship points indicates a sum of each respective relationship point value calculated based on a relationship between the user and each respective different user of the at least one different user according to whether the respective different user is directly related to the user or indirectly related to the user, and
acquire a determination result; and
an output control unit configured to
perform control in a manner such that display of information corresponding to the determination result and the action executed by the at least one different user of the plurality of different users is performed,
wherein respective relationship point values are determined according to relationships between users in a social networking service,
wherein each different user that is indirectly related to the user is determined to be directly related to a different user that is also directly related to the user,
wherein a respective relationship point value for each different user that is directly related to the user is greater than a respective relationship point value for each different user that is indirectly related to the user, and
wherein the determination unit and the output control unit are each implemented via at least one processor.

2. The information processing apparatus according to claim 1, wherein the action executed by the at least one different user of the plurality of different users is performed on the at least one different terminal.

3. The information processing apparatus according to claim 2, wherein the action executed on the at least one different terminal by the at least one different user of the plurality of different users includes at least a recording reservation of content.

4. The information processing apparatus according to claim 2, wherein the action executed on the at least one different terminal by the at least one different user of the plurality of different users includes at least viewing of content.

5. The information processing apparatus according to claim 2, wherein the action executed on the at least one different terminal by the at least one different user of the plurality of different users includes at least any one of an action to be executed according to a reservation, a currently executed action, or an already executed action.

6. The information processing apparatus according to claim 1, wherein when the total value of the relationship points is equal to or greater than a threshold, the determination unit makes a determination to display the recommendation to the user to execute the recommended action corresponding to the action executed by the at least one different user of the plurality of different users.

7. The information processing apparatus according to claim 6, further comprising:
an adjustment unit configured to adjust a predetermined parameter according to a number of different users directly related to the user among the plurality of different users,
wherein the adjustment unit is implemented via at least one processor.

8. The information processing apparatus according to claim 7, wherein the adjustment unit adjusts the threshold according to the number of different users directly related to the user among the plurality of different users.

9. The information processing apparatus according to claim 8, wherein, when the number of different users directly related to the user among the plurality of different users exceeds an upper limit value, the adjustment unit increases the threshold.

10. The information processing apparatus according to claim 7, wherein the adjustment unit adjusts each relationship point indicating the relationship between the user and each different user indirectly related to the user among the plurality of different users according to the number of different users directly related to the user among the plurality of different users.

11. The information processing apparatus according to claim 7, wherein, when the number of different users directly related to the user among the plurality of different users exceeds an upper limit value, the adjustment unit decreases each relationship point indicating the relationship between the user and a different user indirectly related to the user among the plurality of different users.

12. The information processing apparatus according to claim 7, wherein, when the number of different users directly related to the user among the different users falls below a lower limit value, the adjustment unit increases each relationship point indicating the relationship between the user and a different user indirectly related to the user among the plurality of different users.

13. The information processing apparatus according to claim 6, further comprising:
an adjustment unit configured to adjust a predetermined parameter based on a history of actions executed by the user in the past,
wherein the adjustment unit is implemented via at least one processor.

14. The information processing apparatus according to claim 13, wherein the adjustment unit adjusts the threshold for the total value of the relationship points based on the history of the actions executed by the user in the past.

15. The information processing apparatus according to claim 6, wherein the threshold is determined according to a number of different users among the plurality of different users that are directly related to the user.

16. The information processing apparatus according to claim 1, wherein the relationships between users in the social networking service are determined according to social graphs between the users.

17. An information processing method comprising:
determining whether to display a recommendation to a user who uses a terminal to execute a recommended action corresponding to an action executed by at least one different user of a plurality of different users who uses at least one different terminal, based on a total value of relationship points for the at least one different user,
wherein the total value of the relationship points indicates a sum of each respective relationship point value calculated based on a relationship between the user and each respective different user of the at least one different user according to whether the respective different user is directly related to the user or indirectly related to the user;
acquiring a determination result; and
performing control in a manner such that display of information corresponding to the determination result and the action executed by the at least one different user of the plurality of different users is performed,
wherein respective relationship point values are determined according to relationships between users in a social networking service,
wherein each different user that is indirectly related to the user is determined to be directly related to a different user that is also directly related to the user, and
wherein a respective relationship point value for each different user that is directly related to the user is greater than a respective relationship point value for each different user that is indirectly related to the user.

18. A terminal comprising:
an acquisition unit configured to acquire a determination result indicating whether to display a recommendation to a user who uses the terminal to execute a recommended action corresponding to an action executed by at least one different user of the plurality of different users who uses at least one different terminal, based on a total value of relationship points for the at least one different user,
wherein the total value of the relationship points indicates a sum of each respective relationship point value calculated based on a relationship between the user and each respective different user of the at least one different user according to whether the respective different user is directly related to the user or indirectly related to the user; and
a display control unit configured to perform control in a manner such that display of information corresponding to the determination result and the action executed by the at least one different user of the plurality of different users is performed,
wherein respective relationship point values are determined according to relationships between users in a social networking service,
wherein each different user that is indirectly related to the user is determined to be directly related to a different user that is also directly related to the user,
wherein a respective relationship point value for each different user that is directly related to the user is greater than a respective relationship point value for each different user that is indirectly related to the user, and
wherein the acquisition unit and the display control unit are each implemented via at least one processor.

19. A control method comprising:
acquiring a determination result indicating whether to display a recommendation to a user who uses a terminal to execute a recommended action corresponding to an action executed by at least one different user of a plurality of different users who uses at least one different terminal, based on a total value of relationship points for the at least one different user,
wherein the total value of the relationship points indicates a sum of each respective relationship point value calculated based on a relationship between the user and each respective different user of the at least one different user according to whether the respective different user is directly related to the user or indirectly related to the user; and
performing control in a manner such that display of information corresponding to the determination result and the action executed by the at least one different user of the plurality of different users is performed,
wherein respective relationship point values are determined according to relationships between users in a social networking service,
wherein each different user that is indirectly related to the user is determined to be directly related to a different user that is also directly related to the user, and
wherein a respective relationship point value for each different user that is directly related to the user is greater than a respective relationship point value for each different user that is indirectly related to the user.

20. A non-transitory computer-readable medium having embodied thereon a program, which when executed by a computer causes the computer to execute a method, the method comprising:
acquiring a determination result indicating whether to display a recommendation to a user who uses a terminal to execute a recommended action corresponding to an action executed by at least one different user of a plurality of different users who uses at least one different terminal, based on a total value of relationship points for the at least one different user,
wherein the total value of the relationship points indicates a sum of each respective relationship point value calculated based on a relationship between the user and each respective different user of the at least one different user according to whether the respective different user is directly related to the user or indirectly related to the user; and performing control in a manner such that display of information corresponding to the determination result and the action executed by the at least one different user of the plurality of different users is performed, wherein respective relationship point values are determined according to relationships between users in a social networking service, wherein each different user that is indirectly related to the user is determined to be directly related to a different user that is also directly related to the user, and wherein a respective relationship point value for each different user that is directly related to the user is greater than a respective relationship point value for each different user that is indirectly related to the user.

* * * * *